UNITED STATES PATENT OFFICE.

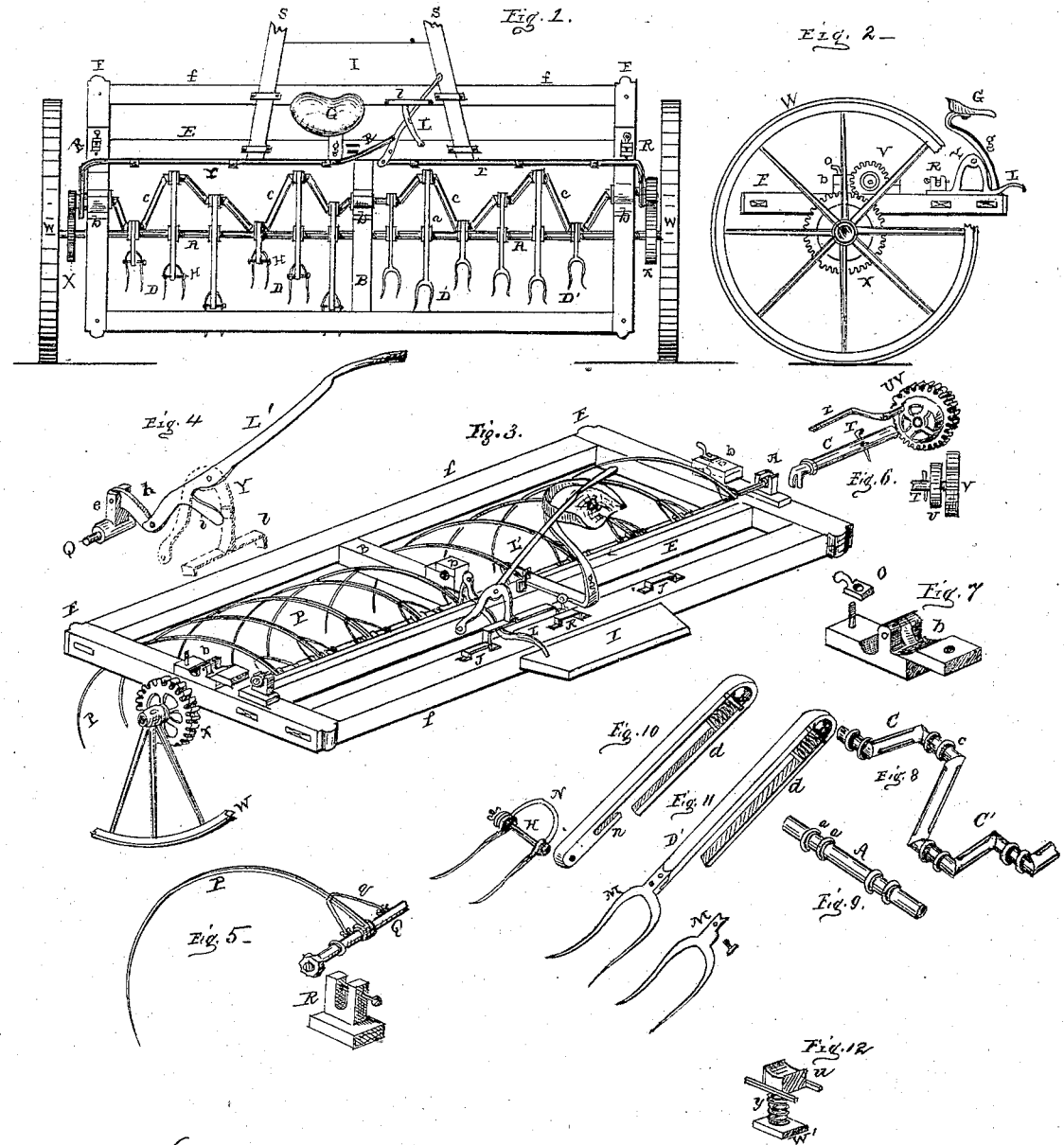

ROBERT J. COLVIN, OF LANCASTER, PENNSYLVANIA.

IMPROVEMENT IN COMBINED RAKES AND TEDDERS.

Specification forming part of Letters Patent No. 138,132, dated April 22, 1873; application filed October 9, 1872.

*To all whom it may concern:*

Be it known that I, ROBERT J. COLVIN, of Lancaster, in the county of Lancaster and State of Pennsylvania, have invented certain Improvements in a Combined Tedder and Horse-Rake, of which the following is a specification:

The first part of my invention relates to the combination of a three-throw crank with sliding spring-forks, so geared and operated that when in motion these forks effectually turn the cut grass, leaving it tossed up lightly to admit a free circulation of the air, whereby it is speedily dried and fitted for being removed from the field as properly-cured hay. The second part of my invention relates to the facility and ease by which the tedder-frame is converted into an improved horse hay-rake.

The accompanying drawing shows the arrangement and construction of the parts.

Figure 1 is a top view, showing two kinds of forks and the three-throw crank and gearing. Fig. 2 is a side elevation; Fig. 3, a perspective view of the frame and rake attachment. Figs. 4, 5, 6, 7, 8, 9, 10, 11, and 12 are parts shown in detail.

There is no special novelty in the oblong frame F F B E $f f$, which forms the truck, mounted on wheels W, and provided with keepers J, which adapts it for the attachment of a pole or pair of shafts, and is readily changed from a one-horse to a two-horse machine. There is also a seat, G, and foot-board I shown. The axle A of the wheels W has a cogged wheel, X, on each end, inside the wheel W, and is also provided with flanged shoulders $a\ a$, at regular intervals, between which the double or parallel stems D $d$, as guides to the forks, are held in their sliding motion while being operated by the action of the crank C, to which their curved upper ends are attached. This crank-rod C is so formed as to have the bends in a triangular arrangement duplicated, one on each side of the central beam B, as shown, with six forks each, the stems D $d$ of which are bent round and embrace the crank-rod between shoulders or flanges on the same. There is a partial box, $u$, formed, Fig. 12, between the parallel stems next the crank on a sliding plate, which is notched out to receive the sides of the stem, and connected to a base-plate, W', by a coiled spring, $y$. This base-plate W' slides in and out in grooves made on the inside of said stems D $d$. The whole can be slipped up from below. The springs yield so as to allow the base-plate play until it reaches the groove, when it is slipped in also, and secured in its place, thus forming an elastic box or shifting bearing for the crank-connection, and to relieve it from a sudden strain, and adapt it to the free motions of the fork.

I show a modification in the construction and attachment of the tines of my forks. The one, Fig. 10, adapted to light grass, differs in the stem D simply by a hole for a bolt near the end, and an open slot, $n$, the tines being coiled to form an eye, and a continuous bow, N, which bow, being slipped into the open slot $n$ on the stem, brings the eyes in the tines opposite the hole in the stem, so that a headed bolt, H, can be passed through and secured by a nut, which attaches a spring-fork.

For heavier grass the tines may be as in ordinary forks, Fig. 11, with the short shank M spliced to the stem D' by a dovetail union, and secured by a headed screw-bolt. I use hinged boxes $b$ for the outer ends of the crank-shafts $c\ c$. The central box may be made in like manner, or the ends of the crank simply inserted, while the outer end is laid into the open box, and the hinged part closed down and secured by the handled nut O. On the outer end of the crank-shafts $c\ c$ are four radiating pins, T, and a loose clutch, U, united with a pinion, V. This clutch has four notches on its inner face. The four pins T enter these notches, and bring the pinion in gear with the cogged wheel X on the axle of the machine, being actuated by a rod or wire, $r$, between the clutch and pinion, and carried from each side, held in keepers along the inner upper edge of the beam E of the machine to a lever, L, connected on opposite sides, equidistant from the fulcrum-pin, by which lever, convenient to the right foot of the driver on his seat, the machine is readily put in or out of gear to arrest the action of the forks, or to put them in motion at pleasure.

By this arrangement of the crank in a three-fold relation twice duplicated, the forks receive a natural (or hand-like) motion for turning and tossing the hay or cut grass retained partially by, but sliding on, the axle, which not only guides the forks, but gives them the requisite motion by the simple gearing on each side of the machine, making it less complicated and much more efficient in performing its work as an improved tedder.

To utilize the frame and adapt it for a horse-rake, I affix permanent bearings R, Fig. 5, on each side, and centrally on the frame-pieces F F. On the keeper $l$ of the lever L there is a permanent bow, Y, attached, Fig. 4, and affixed by its one leg to the cross-piece E of the frame, so that the lever L', being connected with the rake-shaft Q with its jointed connection $e\ h$, can be attached to the bowed bearing Y by a bolt and nut, and the rake-shaft laid into the forked bearings R, and secured by a pin or bolt. After the crank or tedder arrangement is lifted out of the hinged boxes, the machine is then a horse-rake, as shown by Fig. 3. The handle or lever L', close to the right hand of the driver, for raising and discharging the rake, has a foot-piece, I, which can be brought under a lug on the side of the outer leg of the support Y, and keep the rake in an elevated position when not in use. The teeth are each independent in their motions on the rake-shaft held between shoulders or flanges, and a spring-brace, $q$, connected on each side of the tooth by a coiled attachment, and bearing upon the tooth; thus an independent spring-pressure is given to each tooth, so that if one tooth is raised it does not affect the others.

The primary object is the tedder. The rake attachment is a matter of economy and convenience.

I am aware that tedders are in use for the same purpose; but I am not aware of any being made and arranged substantially in the same manner, and by using the same frame for the horse hay-rake, which makes it especially valuable on the farm.

What I claim, and desire to secure by Letters Patent, is—

1. The fork-handle, consisting of the parts D $d$, having an open end to facilitate its detachment from the guide-axle when the tedder-shaft is removed, substantially as and for the purpose described.

2. The crank-shaft C, attached as described, in combination with the fork-handles D $d$, spring-bearing $u\ w\ y$, and axle A, with its shouldered guide-flanges $a\ a$, and pinions X V, all arranged as and for the purpose described.

3. In combination with the above second claim, and the frame having bearings $b$ and R, a detachable rake, constructed and operated as and for the purpose described.

ROBT. J. COLVIN.

Witnesses:
JNO. M. AMWEG,
JACOB STAUFFER.